US012683715B2

(12) United States Patent
Yoshikawa

(10) Patent No.: US 12,683,715 B2
(45) Date of Patent: Jul. 14, 2026

(54) COMMUNICATION APPARATUS, CONTROL METHOD, AND COMPUTER-READABLE STORAGE MEDIUM

(71) Applicant: CANON KABUSHIKI KAISHA, Tokyo (JP)

(72) Inventor: Yuki Yoshikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 402 days.

(21) Appl. No.: 18/309,664

(22) Filed: Apr. 28, 2023

(65) Prior Publication Data

US 2023/0269027 A1 Aug. 24, 2023

Related U.S. Application Data

(63) Continuation of application No. PCT/JP2021/034045, filed on Sep. 16, 2021.

(30) Foreign Application Priority Data

Nov. 4, 2020 (JP) ................................ 2020-184644

(51) Int. Cl.
*H04L 1/00* (2006.01)

(52) U.S. Cl.
CPC .......... *H04L 1/0083* (2013.01); *H04L 1/0008* (2013.01)

(58) Field of Classification Search
CPC ... H04L 1/0083; H04L 1/0008; H04L 1/1614; H04L 1/1887; H04L 5/0023; H04L 5/0048; H04W 76/15; H04W 84/12; H04W 56/001
See application file for complete search history.

(56) References Cited

U.S. PATENT DOCUMENTS

| | | | | |
|---|---|---|---|---|
| 2017/0170937 A1* | 6/2017 | Chun | .................... | H04L 5/0094 |
| 2018/0206174 A1 | 7/2018 | Zhou | | |
| 2021/0251006 A1* | 8/2021 | Cariou | .............. | H04W 74/0816 |

FOREIGN PATENT DOCUMENTS

| | | |
|---|---|---|
| JP | 2018050133 A | 3/2018 |
| WO | 2020040589 A1 | 2/2020 |

OTHER PUBLICATIONS

Liuming Lu, et al., Multi-link Operation for Constrained MLD, IEEE 802.11-20/0972r2, Jun. 28, 2020.
Shubhodeep Adhikari, et al., Proposals for an NSTR soft AP, IEEE 802.11-20/1540r0, Sep. 13, 2020.
Edward Au (Huawei); "Compendium of straw polls and potential changes to the Specification Framework Document"; EEE 802.11-20/0566r87; Nov. 3, 2020; (Retrieved on Nov. 29, 2021) <URL:https://mentor.ieee.org/802.11/dcn/20/11-20-0566-87-00be-compendium-of-straw-polls-and-potential-changes-to-the-specification-framework-document.docx>; p. 77.

(Continued)

*Primary Examiner* — Jamal Javaid
(74) *Attorney, Agent, or Firm* — Canon U.S.A., Inc. IP Division

(57) ABSTRACT

A communication apparatus that performs communication complying with the IEEE802.11 standard series with a partner apparatus using a plurality of radio links performs control such that when a predetermined frame that is a group addressed frame is transmitted in a first radio link of the plurality of radio links, a frame addressed to the communication apparatus does not arrive in a second radio link different from the first radio link of the plurality of radio links.

13 Claims, 11 Drawing Sheets

(56)     References Cited

OTHER PUBLICATIONS

Zhou Lan (Broadcom Inc.); "MLO Async. and Sync. Operation Discussion"; IEEE 802.11-20/0291r1; Apr. 6, 2020; (Retrieved on Nov. 29, 2021); <URL:https://mentor.ieee.org/802.11/dcn/20/11-20-0291-01-00be-mlo-async-andsync-operation-discussion.pptx>; pp. 1-22.

Ronny Yongho Kim (KNUT); "Issues on MLD Power Saving"; IEEE 802.11-20/1402r1, Oct. 28, 2020; Retrieved on Nov. 29, 2021; < URL:https://mentor.ieee.org/802.11/dcn/20/11-20-1402-01-00be-issues-on-mld-powersaving.pptx>; slide 9.

Alfred Asterjadhi (Qualcomm Inc.); "Tgbe Motions List for Tele-conferences"; IEEE 802.11-20/0841r33, Nov. 3, 2020; Retrieved on Nov. 29, 2021; <URL:https://mentor.ieee.org/802. 11/dcn/20/11-20-0841-33-00be-tgbe-motionslist-for-teleconferences.pptx>; p. 18.

Edward Au, Compendium of straw polls and potential changes to the Specification Framework Document, IEEE 1 802.11-20/0566r87, Nov. 3, 2020, p. 1-p. 252.

* cited by examiner

F I G. 1
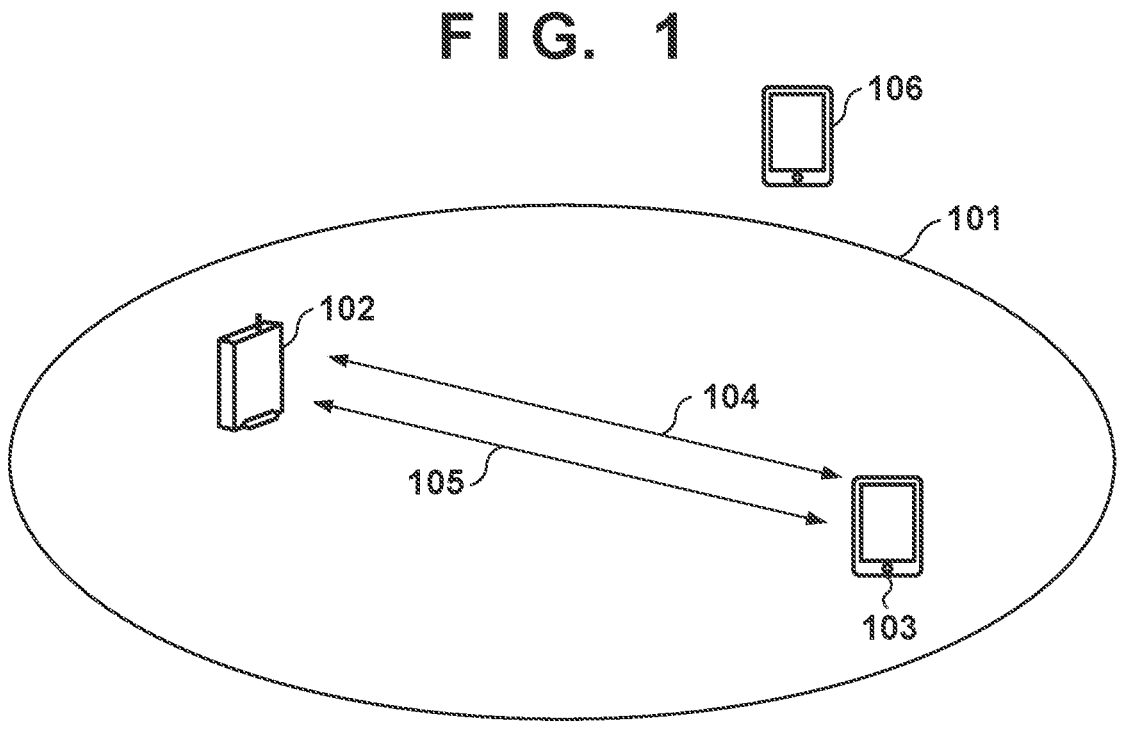
F I G. 2
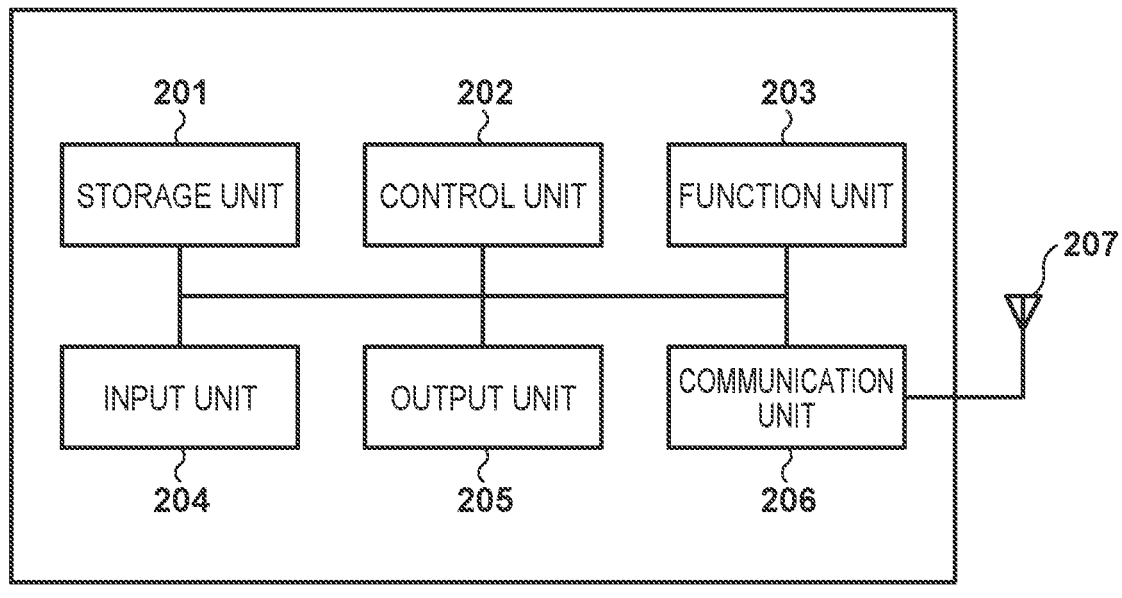

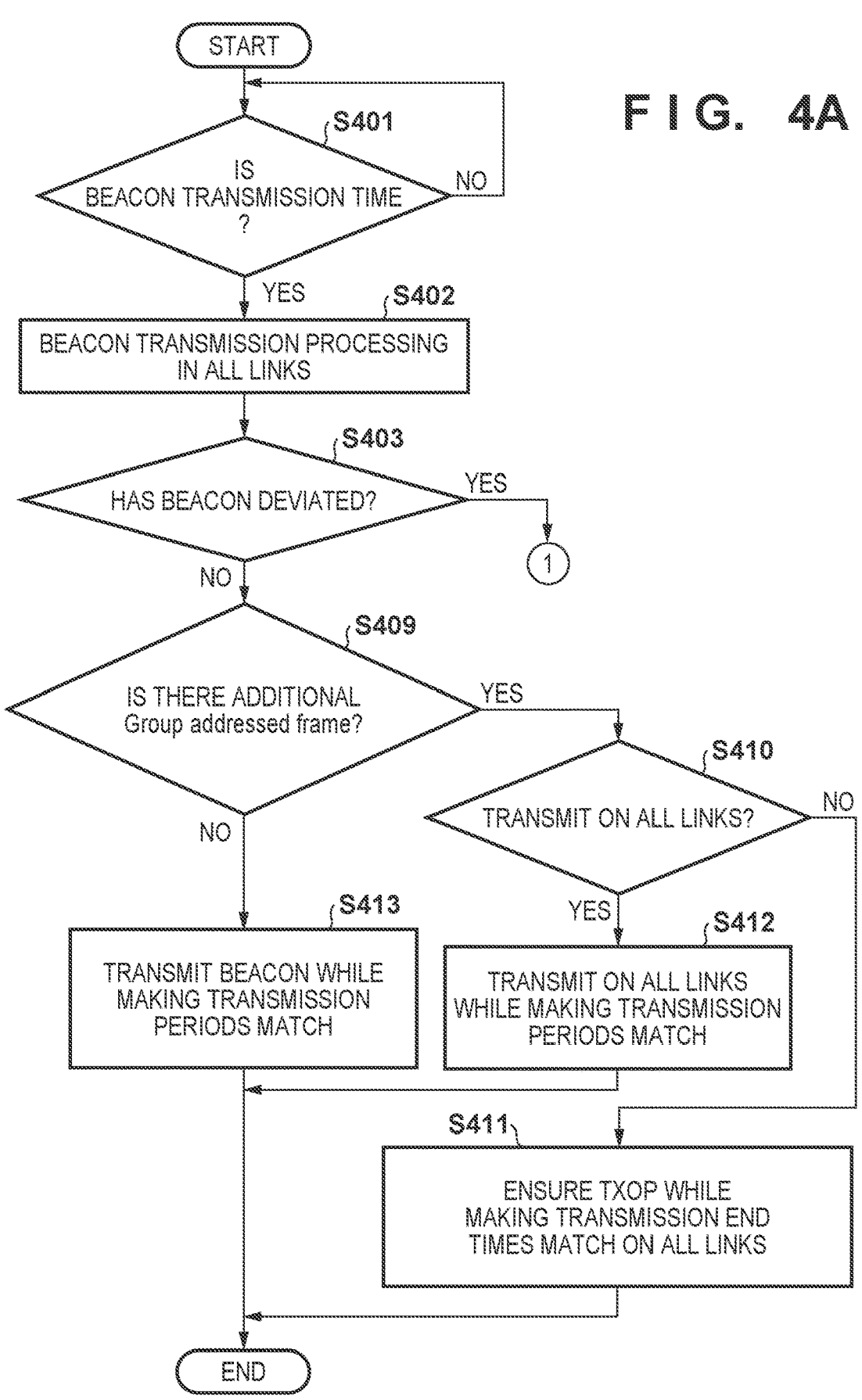
F I G.　4A

F I G. 5

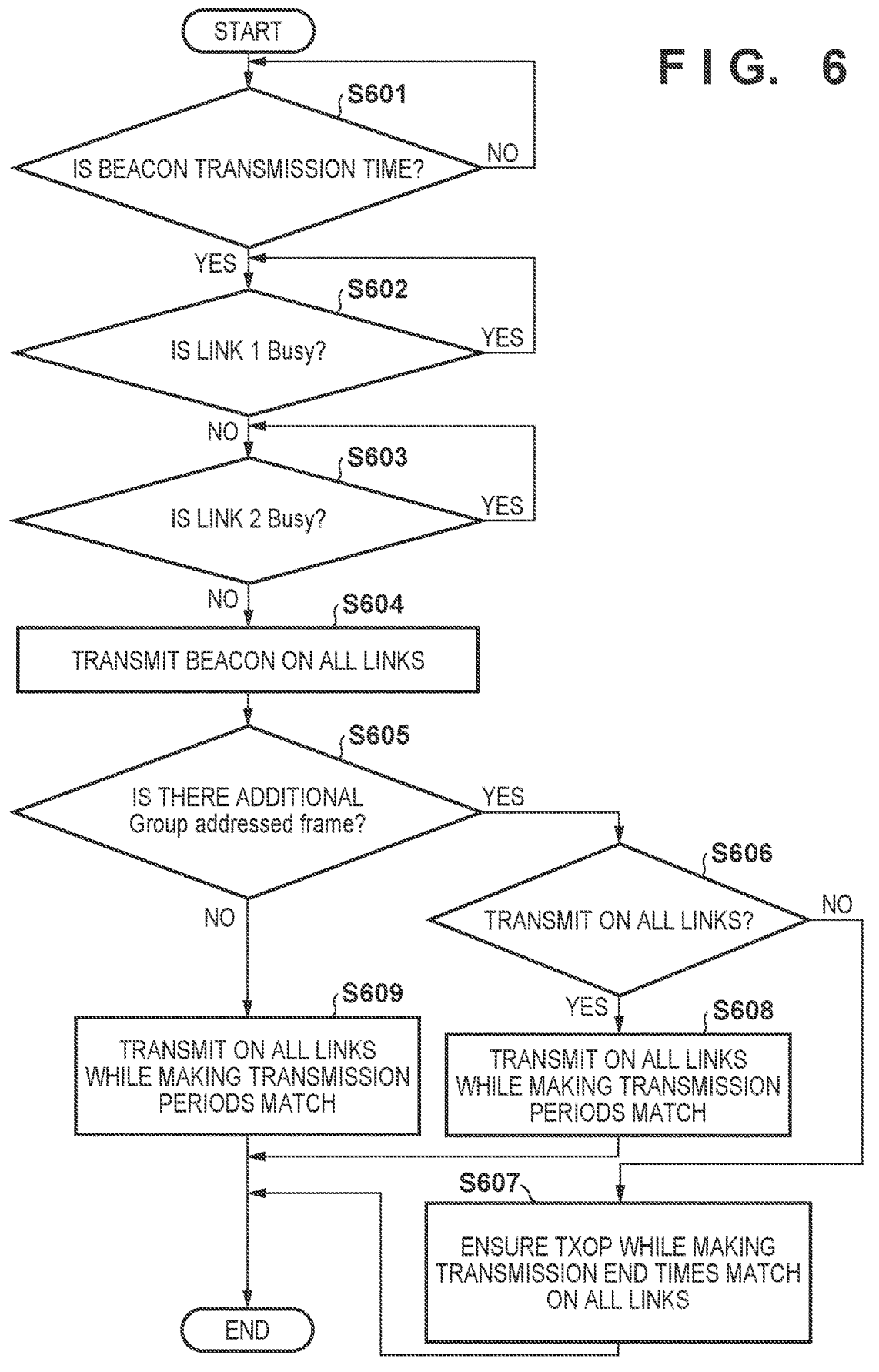
F I G.  6

F I G. 7

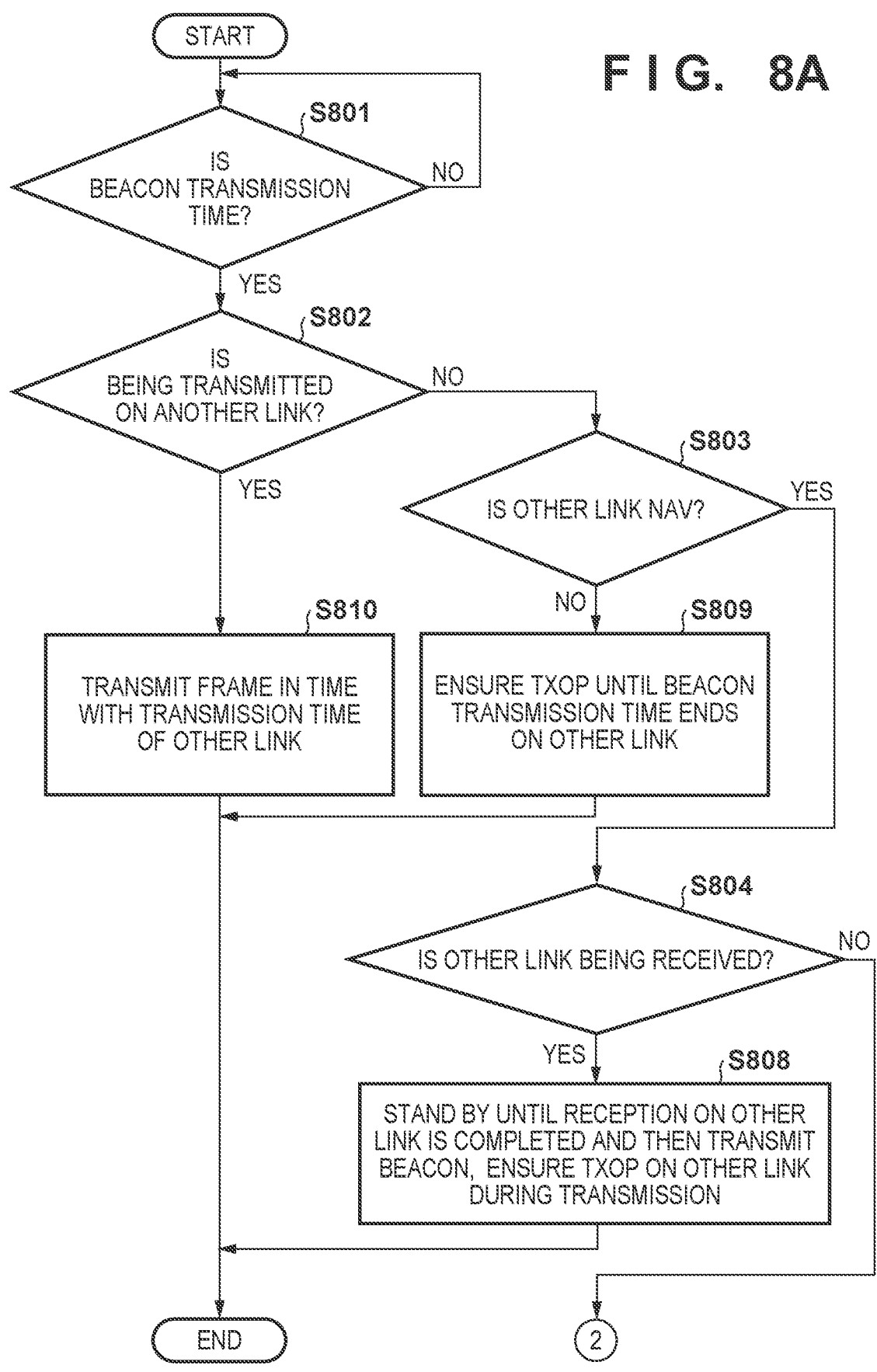
F I G.  8A

F I G. 8B
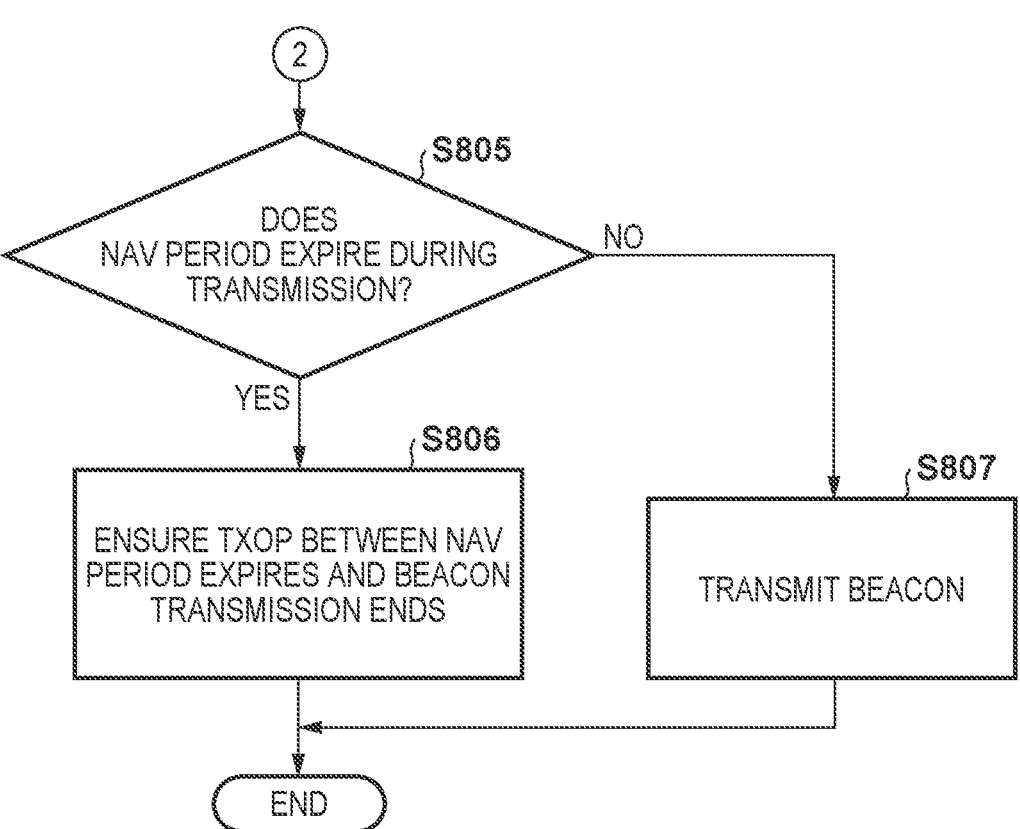

F I G. 9

COMMUNICATION APPARATUS, CONTROL METHOD, AND COMPUTER-READABLE STORAGE MEDIUM

CROSS-REFERENCE TO RELATED APPLICATIONS

This application is a Continuation of International Patent Application No. PCT/JP2021/034045, filed Sep. 16, 2021, which claims the benefit of Japanese Patent Application No. 2020-184644 filed Nov. 4, 2020, both of which are hereby incorporated by reference herein in their entireties.

BACKGROUND OF THE INVENTION

Field of the Invention

The present invention relates to a communication control technique considering a communication apparatus with constraints on operations.

Background Art

As communication standards concerning a wireless LAN (Wireless Local Area Network), IEEE (Institute of Electrical and Electronics Engineers) 802.11 standards are known. The IEEE802.11 standards are the standard series including IEEE802.11a/b/g/n/ac/ax standards. Japanese Patent Laid-Open No. 2018-050133 describes that communication using OFDMA (Orthogonal Frequency-Division Multiple Access) is performed in the IEEE802.11ax standard. In wireless communication using OFDMA, high peak throughput can be implemented. In addition, a sufficient communication speed can be ensured in a congested state.

Presently, to further improve the throughput, the IEEE802.11be standard has been defined as a new standard of the IEEE802.11 standard series. In the IEEE802.11be standard, multi-link communication in which one access point (AP) executes communication by establishing, with one station (STA), a plurality of radio links in one or more frequency bands has been examined. In multi-link communication, for example, an AP establishes, with an STA, connections using a plurality of frequency channels in at least one of the 2.4-, 5-, and 6-GHz frequency bands, and communicates with the STA using the frequency channels concurrently. Note that there may exist an AP or an STA, which can perform multi-link communication but cannot perform a reception operation in another link while performing a transmission operation in a predetermined link due to constraints on the hardware of the apparatus.

An AP that performs multi-link communication needs to periodically transmit a beacon in each link. However, if the AP is an apparatus that cannot perform the reception operation in another link during the transmission operation in a predetermined link, the AP cannot transmit a beacon in another link when it is receiving certain data in the predetermined link. In addition, the AP may need to transmit a group addressed frame that collectively transmits information to a plurality of apparatuses. However, it may be impossible to transmit such a frame due to the same reason as described above. Even in a case where the timing of beacon transmission by the AP in the predetermined link is determined in advance, the timing of beacon transmission may have deviated depending on the degree of congestion of the link. Even in this case, the AP operates under a constraint that it cannot perform the reception operation in another link during the transmission operation in the predetermined link.

SUMMARY OF THE INVENTION

The present invention provides a communication control technique for inhibiting a communication apparatus from concurrently performing transmission and reception.

According to one aspect of the present invention, there is provided a communication apparatus comprising a communication unit configured to perform communication complying with the IEEE802.11 standard series with a partner apparatus using a plurality of radio links, and a control unit configured to control the communication unit such that when a predetermined frame that is a group addressed frame is transmitted in a first radio link of the plurality of radio links, a frame addressed to the communication apparatus does not arrive in a second radio link different from the first radio link of the plurality of radio links.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 1 is a view showing an example of the configuration of a wireless communication system.

FIG. 2 is a view showing an example of the hardware configuration of a communication apparatus.

FIG. 4A is a flowchart showing an example of the procedure of processing executed by an access point.

FIG. 5 is a view showing an example of the procedure of communication in the wireless communication system.

FIG. 6 is a flowchart showing an example of the procedure of processing executed by the access point.

FIG. 7 is a view showing an example of the procedure of communication in the wireless communication system.

FIG. 8A is a flowchart showing an example of the procedure of processing executed by the access point.

FIG. 8B is a flowchart showing an example of the procedure of processing executed by the access point.

FIG. 9 is a view showing an example of the procedure of communication in the wireless communication system.

DESCRIPTION OF THE EMBODIMENTS

Figure 3:
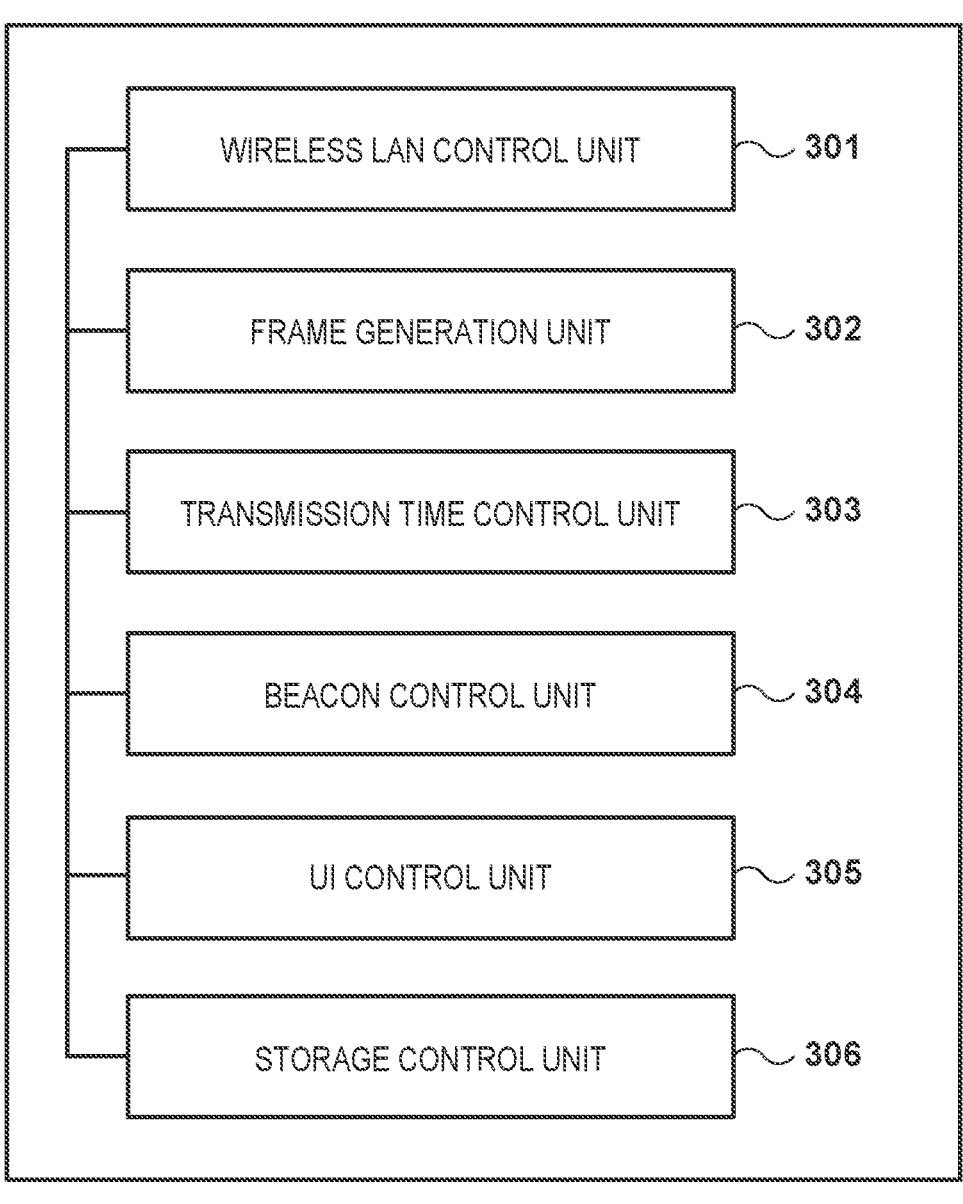
FIG. 3 is a view showing an example of the functional configuration of the communication apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(Configuration of Wireless Communication System)

FIG. 1 shows an example of the configuration of a wireless communication system according to this embodiment. The wireless communication system includes a plurality of communication apparatuses, and the communication apparatuses transmit/receive radio signals to/from each other, thereby performing communication. In the wireless communication system, in an example, an access point (AP 102) forms a network 101, and a station (STA 103) participates in the network 101. The STA 103 can participate in the network 101 and communicate with the AP 102. FIG. 1 also shows a state in which an STA 106 that does not participate in the network 101 exists. The STA 106 exists at such a position that it cannot communicate with the AP 102 but is affected by the interference of a signal from the AP 102, and additionally, a signal sent from the STA 106 interferes with the communication of the AP 102.

Here, the AP 102 and the STA 103 are each configured to be able to execute wireless communication complying with the IEEE (Institute of Electrical and Electronics Engineers) 802.11be (EHT) standard. Note that the AP 102 and the STA 103 may support a legacy standard that is a standard before the IEEE802.11be standard. For example, the AP 102 and the STA 103 can be configured to support at least one of the IEEE802.11a/b/g/n/ac/ax standards. The AP 102 and the STA 103 may support other communication standards such as Bluetooth®, NFC, UWB, ZigBee, and MBOA, in addition to the IEEE802.11 standard series. Note that NFC, UWB, and MBOA are acronyms for Near Field Communication, Ultra Wide Band, and Multi Band OFDM Alliance, respectively. UWB includes wireless USB, wireless 1394, WiNET, and the like. Also, the AP 102 and the STA 103 may support a communication standard of wired communication such as a wired LAN. As an example, the AP 102 can be a wireless LAN router, a personal computer (PC), or the like but is not limited to these. The AP 102 may be an information processing device such as a radio chip capable of executing wireless communication complying with the IEEE802.11be standard. As an example, the STA 103 can be a camera, a tablet, a smartphone, a PC, a portable telephone, a video camera, a head set, or the like but is not limited to these. The STA 103 may be an information processing device such as a radio chip capable of executing wireless communication complying with the IEEE802.11be standard.

The AP 102 and the STA 103 can communicate in frequency bands including, for example, the 2.4-GHz band, the 5-GHz band, and the 6-GHz band. Note that these frequency bands are merely examples, and the AP 102 and the STA 103 may be able to use a frequency band other than these, for example, the 60-GHz band. In addition, the AP 102 and the STA 103 can communicate using one of bandwidths of 20 MHz, 40 MHz, 80 MHz, 160 MHz, and 320 MHz. Note that these are merely examples, and the AP 102 and the STA 103 may be configured to be communicable using a different bandwidth, for example, 240 MHz or 4 MHz.

The AP 102 and the STA 103 execute OFDMA (Orthogonal Frequency-Division Multiple Access) communication complying with the IEEE802.11be standard, thereby executing multi-user (MU) communication in which signals of a plurality of users are multiplexed. In the OFDMA communication, a usable frequency band is divided into RUs (Resource Units), and frequency resources not overlapping are assigned to each STA in units of RU. Note that a subcarrier in an RU is configured to be orthogonal to a subcarrier in another RU. This allows the AP 102 to concurrently communicate with a plurality of STAs in a defined bandwidth.

The AP 102 and the STA 103 are configured to be able to establish a plurality of established radio links via a plurality of frequency channels, respectively, and execute multi-link communication in which they communicate using one or more radio links. Note that the radio link will simply be referred to as a "link" hereinafter. In the IEEE802.11 standard series, the bandwidth of each frequency channel is defined as 20 MHz. Also, the frequency channel here is a frequency channel defined in the IEEE802.11 standard series. In the IEEE802.11 standard series, a plurality of frequency channels are defined in each of frequency bands including the 2.4-GHz band, the 5-GHz band, the 6-GHz band, and the 60-GHz band. In the IEEE802.11 standard series, when two frequency channels adjacent to each other are bonded, a bandwidth of 40 MHz can be used by one frequency channel. Similarly, when four frequency channels are bonded, a bandwidth of 80 MHz can be used. Also, when eight frequency channels are bonded, a bandwidth of 160 MHz can be used. When 16 frequency channels are bonded, or when, for example, two 160-MHz bandwidths are used, a bandwidth of 320 MHz can be used.

In this embodiment, as an example, the AP 102 communicates with the STA 103 by establishing a link 104 via a first frequency channel in the 2.4-GHz band and a link 105 via a second frequency channel in the 6-GHz band. The AP 102 and the STA 103 can execute multi-link communication in which the link 104 via the first frequency channel and the link 105 via the second frequency channel are concurrently maintained. According to this, the AP 102 and the STA 103 can improve the throughput of communication by the links via the link frequency channels. Note that in this embodiment, the link 104 is established with a 20-MHz bandwidth in 6 ch of the 2.4-GHz band, and the link number of the link 104 is "1". Also, the link 105 is established with a 320-MHz bandwidth in 113 ch of the 6-GHz band, and the link number of the link 105 is "2".

Note that in the multi-link communication, links established in different frequency bands may be used, or some of the plurality of links may be established in a common frequency band. For example, multi-link communication may be performed between the AP 102 and the STA 103 by establishing one link in each of the 2.4-GHz band, the 5-GHz band, and the 6-GHz band. Also, individual links may be established in 1 ch and 6 ch of the 2.4-GHz band, and multi-link communication may be performed between the AP 102 and the STA 103 using these links. Two or more links may be established in the 2.4-GHz band, one or more links may be established in the 5-GHz band or the 6-GHz band, and multi-link communication may be performed between the AP 102 and the STA 103 using these links. That is, in multi-link communication, links are established using two or more of a plurality of frequency channels defined in a plurality of frequency bands. The frequency channels of the two or more links can be arbitrary unless these overlap each other. Even if congestion occurs in one frequency band, the AP 102 and the STA 103 can continue communication in another frequency band by establishing a plurality of links of different frequency channels. This can prevent lowering of throughput and delay of communication.

When performing multi-link communication, each of the AP 102 and the STA 103 divides one data and transmits the divided data to the partner apparatus via a plurality of links. Also, the AP 102 and the STA 103 may be able to execute MIMO (Multiple-Input Multiple-Output) communication in each link. In this case, the AP 102 and the STA 103 each have a plurality of antennas. The transmitting-side apparatus transmits a plurality of data streams from a plurality of transmission antennas concurrently via the same frequency channel. The receiving-side apparatus concurrently receives, using a plurality of reception antennas, a plurality of signals sent from the plurality of transmission antennas and demultiplexes/decodes the plurality of data streams from the signals. Thus, the AP 102 and the STA 103 can transmit/ receive more data in a common time/frequency resource using MIMO communication. In addition, when performing multi-link communication, the AP 102 and the STA 103 may execute MIMO communication only in some links.

Note that FIG. 1 shows the configuration of the system including one AP 102, one STA 103 connected to the AP 102, and the STA 106 that is not connected to the AP 102. The numbers and arrangement of APs and STAs are not limited to these. For example, one or more STAs connected to the AP 102 may be added. At this time, the frequency bands of links established between the AP and each STA, the number of links, and the bandwidths can arbitrarily be set.

The STA 106 can be an arbitrary apparatus that operates in a specific link of the links established between the AP 102 and the STA 103 without considering other links. For example, the STA 106 does not participate in the network 101 but may participate in the network 101. In this case, the STA 106 can be an STA complying with not the IEEE802.11be standard but, for example, only the IEEE802.11b standard. In this case, the STA 106 can establish a link to the AP 102 in 6 ch of the 2.4-GHz band. Also, the STA 106 may be a wireless communication apparatus that does not comply with the IEEE802.11 standard series, or a noise generation source such as a microwave oven that is not a communication apparatus and generates radio wave noise. The STA 106 may be a communication apparatus supporting multi-link communication and may be configured to communicate with the AP 102 by establishing a plurality of links. In any case, the STA 106 can perform communication in another link while ignoring an operation in a predetermined link.

(Apparatus Configuration)

FIG. 2 is a view showing an example of the hardware configuration of the AP 102 according to this embodiment. The AP 102 includes, for example, a storage unit 201, a control unit 202, a function unit 203, an input unit 204, an output unit 205, a communication unit 206, and an antenna 207. Note that the STA 103 can have the same configuration as the AP 102.

The storage unit 201 includes one or more memories such as a ROM and a RAM, and stores computer programs configured to perform various kinds of operations to be described later and various kinds of information such as communication parameters for wireless communication. Note that ROM is an acronym for Read Only Memory, and RAM is an acronym for Random Access Memory. Note that, in addition to or instead of the memory such as the ROM or the RAM, the storage unit 201 may include a storage medium such as a flexible disk, a hard disk, an optical disk, a magnetooptical disk, a CD-ROM, a CD-R, a magnetic tape, a nonvolatile memory card, or a DVD. The storage unit 201 may include a plurality of memories.

The control unit 202 is formed by, for example, one or more processors such as a CPU and an MPU, and controls the whole AP 102 by executing, for example, computer programs stored in the storage unit 201. Note that CPU is an acronym for Central Processing Unit, and MPU is an acronym for Micro Processing Unit. The control unit 202 can be configured to execute processing of generating data or signals (radio frames) to be transmitted in communication with another communication apparatus (for example, the STA 103) in addition to control of the whole AP 102. Note that the control unit 202 may be configured to execute processing such as control of the whole AP 102 by, for example, cooperation of the computer programs stored in the storage unit 201 and an OS (Operating System). The control unit 202 may include a plurality of processors such as a multi-core processor, and execute processing such as control of the whole AP 102 by the plurality of processors. Furthermore, the control unit 202 may be formed by an ASIC (Application Specific Integrated Circuit), a DSP (Digital Signal Processor), an FPGA (Field Programmable Gate Array), or the like.

The control unit 202 controls the function unit 203 to execute predetermined processing such as image capturing, printing, or projection. The function unit 203 is hardware used by the AP 102 to execute predetermined processing. For example, in a case where the AP 102 is a camera, the function unit 203 is an image capturing unit and performs image capturing processing. For example, in a case where the AP 102 is a printer, the function unit 203 is a printing unit and performs print processing. For example, in a case where the AP 102 is a projector, the function unit 203 is a projection unit and performs projection processing. Data to be processed by the function unit 203 may be data stored in the storage unit 201, or may be data communicated with another communication apparatus (for example, the STA 103) via the communication unit 206 (to be described later).

The input unit 204 accepts various operations from a user. The output unit 205 performs various kinds of outputs to the user. In this example, the output by the output unit 205 includes, for example, at least one of display on a screen, audio output by a loudspeaker, vibration output, and the like. Note that both the input unit 204 and the output unit 205 may be implemented by one module, like a touch panel. Each of the input unit 204 and the output unit 205 may be incorporated in the AP 102 or may be formed as an external apparatus connected to the communication apparatus.

The communication unit 206 controls wireless communication complying with the IEEE802.11 standard series, or controls IP communication. In this embodiment, the communication unit 206 is particularly configured to control wireless communication complying with the IEEE802.11be standard. The communication unit 206 controls the antenna 207 to, for example, transmit/receive signals for wireless communication, which are generated by the control unit 202. If the AP 102 supports the NFC standard, the Bluetooth standard, and the like, the communication unit 206 can also control wireless communication complying with these communication standards. If the AP 102 is configured to be able to execute wireless communication complying with a plurality of communication standards, communication units 206 and antennas 207 complying with the communication standards may individually be prepared. The AP 102 communicates data such as image data, document data, or video data with a communication partner apparatus (for example, the STA 103) via the communication unit 206. Note that the antenna 207 may be prepared separately from the communication unit 206, or may be combined with the communication unit 206 to form one module.

The antenna 207 is an antenna capable of performing communication in each of the sub-GHz band, the 2.4-GHz band, the 5-GHz band, and the 6-GHz band. Note that the AP 102 may include a multi-band antenna as the antenna 207, or may include a plurality of antennas respectively corresponding to the frequency bands. If the AP 102 includes a plurality of antennas 207, it may include one communication unit 206 for the plurality of antennas or a plurality of communication units 206 respectively corresponding to the plurality of antennas 207. Note that the antenna 207 may be a single antenna or an antenna array. That is, the antenna 207 may include a plurality of antenna elements, and may be configured to be able of execute multi-antenna communication such as MIMO communication.

FIG. 3 shows an example of the functional configuration of the AP 102. Note that the STA 103 can have the same functional configuration as the AP 102. As the functional units shown in FIG. 3, the AP 102 includes a wireless LAN control unit 301, a frame generation unit 302, a transmission time control unit 303, a beacon control unit 304, a UI control unit 305, and a storage control unit 306.

The wireless LAN control unit 301 executes control to transmit/receive radio signals to/from another wireless LAN communication apparatus. The wireless LAN control unit 301 executes communication control of the wireless LAN based on a frame generated by the frame generation unit 302 in accordance with a procedure defined by the IEEE802.11 standard series. Note that the AP 102 may include two or more wireless LAN control units 301 on, for example, a frequency band or link basis.

Under the control of the wireless LAN control unit 301, the frame generation unit 302 generates a radio control frame to be transmitted to another apparatus. Constraints may be imparted to the contents of the radio control frame generated by the frame generation unit 302 based on setting information held in the storage unit 201. In addition, the contents of the radio control frame generated by the frame generation unit 302 may be changed by a user setting accepted via the UI control unit 305. The generated radio control frame is transmitted to the partner apparatus via the communication unit 206 under the control of the wireless LAN control unit 301.

According to a time interval acquired from the beacon control unit 304, the transmission time control unit 303 outputs an instruction concerning the timing for transmitting a frame. The wireless LAN control unit 301 controls the communication unit 206 such that the frame generated by the frame generation unit 302 is transmitted in accordance with the instruction from the transmission time control unit 303.

The beacon control unit 304 outputs an instruction concerning the timing for transmitting a beacon or information to be included in the beacon to the frame generation unit 302 and the transmission time control unit 303. The beacon control unit 304 outputs setting information of the time interval to periodically transmit the beacon to the transmission time control unit 303 when the AP 102 starts operating as an AP. The transmission time control unit 303 can output a beacon transmission instruction to the wireless LAN control unit 301 at a time interval based on the setting information. When the transmission time control unit 303 outputs the beacon transmission instruction, the beacon control unit 304 outputs an instruction concerning information to be included in the beacon to the frame generation unit 302. Based on the instruction, the frame generation unit 302 acquires information from the storage unit 201 via the storage control unit 306, and generates a beacon based on the acquired information.

The UI control unit 305 controls the input unit 204 to accept an operation on the AP 102 by a user (not shown) and controls the output unit 205 to present, to the user, information of, for example, display of an image or the like or voice output. The storage control unit 306 executes control processing for data storage in the storage unit 201 or readout of data stored in the storage unit 201.

(Procedure of Communication)

Next, an example of the procedure of communication when the AP 102 executes communication with one or more STAs such as the STA 103 will be described. Note that the following description will be made assuming that the partner apparatus of communication of the AP 102 is the STA 103. However, the AP 102 can also concurrently communicate with a plurality of STAs including the STA 103.

In this embodiment, the description will be made focusing on a state in which the AP 102 transmits a group addressed frame in the link 104 and the link 105 established between the AP 102 and the STA 103. Note that the group addressed frame is a frame mainly used for broadcast to a plurality of STAs. In the group addressed frame, in a Destination Address (DA) or a MAC Address included in an A1 field, an address with a Group Bit set to 1 is set. For example, a beacon is a frame to be broadcast. At this time, the Group Bit is set to 1. Hence, a beacon is a group addressed frame. Also, a multicast address is a group addressed frame because the Group Bit is similarly set to 1.

In this embodiment, during transmission of a signal in one of the link 104 and the link 105, the AP 102 cannot receive a signal in the other link, as described above. On the other hand, the AP 102 is assumed to need to transmit a beacon in each frequency channel (each link). Hence, in each process below, when the AP 102 is transmitting a beacon (group addressed frame) in a certain link, a signal addressed from a peripheral STA or another AP to the AP 102 is inhibited from being transmitted in a frequency channel of another link. An example of the procedure of such processing will be described below. Note that the beacon is merely an example, and the same processing as will be described below can be executed when transmitting an arbitrary group addressed frame. Also, the following processing can be applied even in a case where a predetermined signal whose transmission timing is decided in advance to, for example, a predetermined period should be transmitted. That is, the following processing is applied in a case where an arbitrary predetermined frame (a unicast frame is possible) whose transmission timing is determined in advance exists in a certain link.

Note that an example in which the AP 102 attempts to transmit a beacon (group addressed frame) in all established links will be described below. However, the present invention is not limited to this. That is, the AP 102 may execute the following processing in two or more links that are included in a plurality of established links. For example, such processing can be executed if a group addressed frame such as a beacon needs to be transmitted only in some of the links, and the transmission is unnecessary in the remaining links. In this case, during frame transmission in some links, the AP 102 can ignore frames that have arrived in the remaining links.

An example in which a beacon is transmitted will be described below. The following argument can be applied concerning transmission of an arbitrary group addressed frame or a multicast frame destinated to a multicast address. For example, the beacon in the following explanation may be replaced with a FILS Discovery frame or an Unsolicited Probe Response frame. Note that the FILS Discovery frame is a frame transmitted at an interval of 20 TU between a beacon and a beacon. Here, TU is an acronym for Time Unit, and 1 TU is 1,024 µs. The beacon in the following description may be replaced with a Probe Response frame or an Action frame, which is another management frame.

Processing Example 1

In this processing example, the AP 102 attempts to transmit beacons concurrently at the same timing (at a timing at which at least parts of transmission periods overlap) in both the link 104 and the link 105. Note that the AP 102 need not always transmit beacons simultaneously in the link 104 and the link 105 and is permitted to transmit beacons at different timings in the link 104 and the link 105.

Figure 4B:
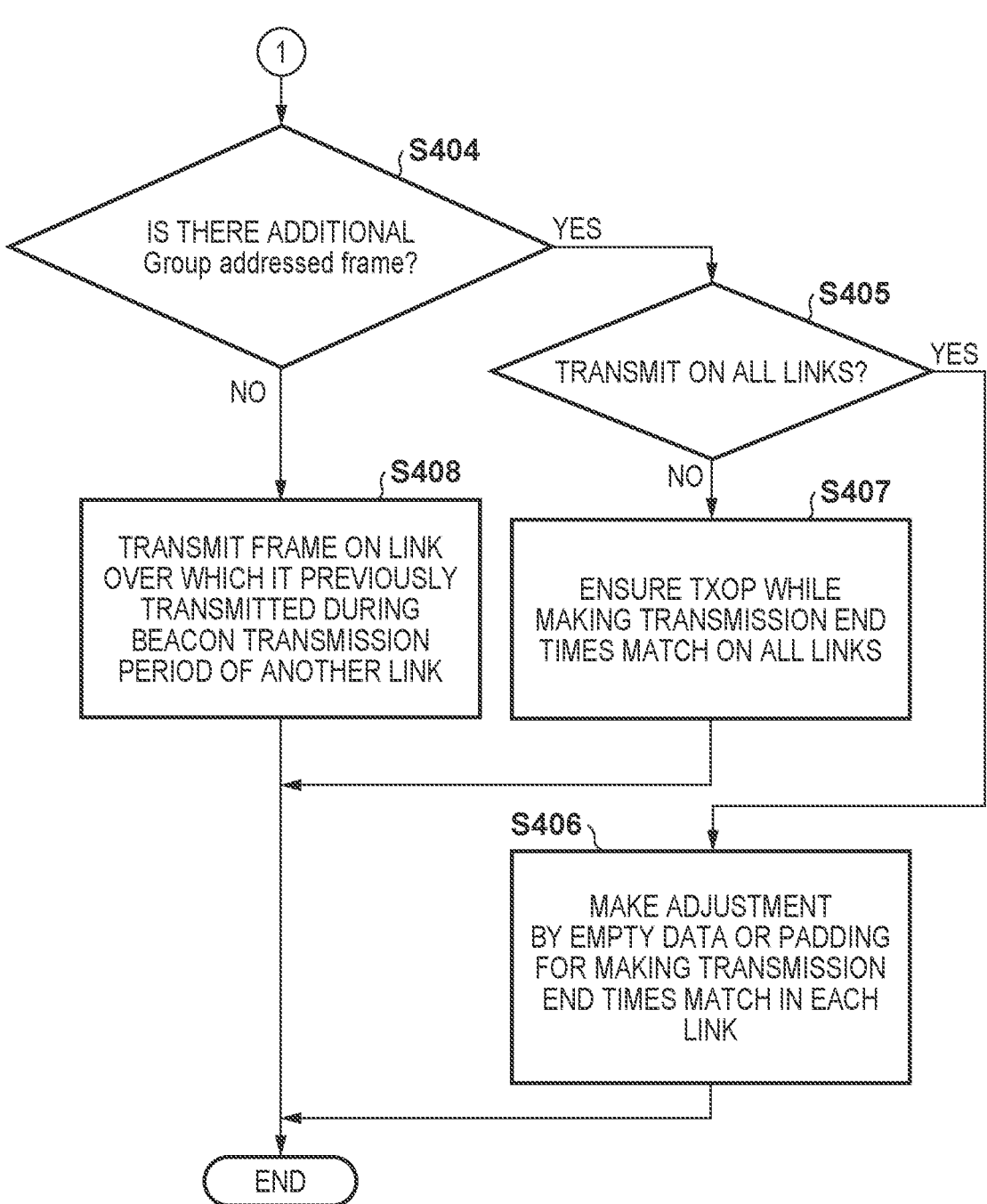
FIG. 4B is a flowchart showing an example of the procedure of processing executed by the access point.

FIGS. 4A and 4B show an example of the procedure of processing executed by the AP 102 in the first processing example. The processing shown in FIGS. 4A and 4B is started when, for example, the AP 102 starts operating as an AP. Note that the processing shown in FIGS. 4A and 4B can be implemented by, for example, the control unit 202 of the AP 102 executing a program stored in the storage unit 201 of the AP 102. However, the present invention is not limited to this, and, for example, some or all of the processes shown in FIGS. 4A and 4B may be implemented by dedicated hardware. Also, the processing shown in FIGS. 4A and 4B is merely an example. Unless there is a particular mention, the order of the processes may be changed, or some of the processes may be omitted or replaced with similar processes.

In this processing, the AP 102 first stands by until the timing (to be referred to as a beacon transmission time hereinafter) for transmitting a beacon (step S401). The beacon transmission time can be specified based on, for example, the set value of a transmission interval stored in the storage unit 201. If the time reaches the beacon transmission time (YES in step S401), the AP 102 executes beacon transmission processing in all the plurality of established links (step S402). Note that the above-described beacon transmission time may be a predetermined timing before the timing for actually transmitting the beacon (Target Beacon Transmission Time: TBTT). The AP 102 may execute processing such that preparation for beacon transmission is started at the predetermined timing, and beacon transmission can be started at the TBTT. While observing the states of the links, the AP 102 attempts to transmit a beacon in all links at the timing for transmitting a beacon. The AP 102 determines whether the beacon cannot be transmitted because, for example, a state in which a channel is congested occurs in any one of the plurality of established links (step S403). If, for example, the STA 106 is transmitting data to another AP in the same frequency channel as the link 104 or the link 105, and the TBTT arrives during the period of the data transmission, the AP 102 determines that the beacon cannot be transmitted in the link of the frequency channel. Note that in this state, the AP 102 transmits the beacon after causing the transmission timing to deviate.

Upon determining that the beacon cannot be transmitted in any one of the links, and the timing of the beacon has deviated (YES in step S403), the AP 102 transmits a signal even in the other link during the beacon transmission period in the link in which the transmission timing has deviated. In this processing example, the AP 102 first determines whether an additional group addressed frame to be transmitted next to the beacon transmission exists (step S404). If an additional group addressed frame can be transmitted in a second link different from a first link in which the transmission timing has deviated, the AP 102 transmits the additional group addressed frame in the second link during the beacon transmission period of the first link. Note that in this case, there is a possibility that the beacon transmission in the first link is completed during the transmission of the additional group addressed frame in the second link, and after that, another AP or a peripheral STA transmits a frame addressed to the AP 102. Hence, in this case, the AP 102 can prevent transmission of a signal addressed to the AP 102 in the first link from occurring during the transmission of the group addressed frame in the second link.

Upon determining that an additional group addressed frame exists (YES in step S404), the AP 102 determines whether to transmit a group addressed frame in all links (step S405). Upon determining to transmit a group addressed frame in all links (YES in step S405), the AP 102 executes adjustment processing to end the transmission of the frame simultaneously (or almost simultaneously) in all links (step S406). This adjustment processing can be performed by, for example, additionally transmitting another frame such as an empty frame or adding a padding bit after the data of a frame whose transmission is to be completed quickly because of a short frame length. Also, in the adjustment processing, in accordance with the transmission period of the additional group addressed frame transmitted in the predetermined link, the AP 102 may perform processing of transmitting an additional group addressed frame that is scheduled to be transmitted with the next beacon even in the other link. Alternatively, in the adjustment processing, in time with the transmission period of the additional group addressed frame transmitted in the predetermined link, the AP 102 may transmit, in the other link, a frame obtained by duplicating the additional group addressed frame.

In addition, during the period in which the beacon or the additional group addressed frame is transmitted in the predetermined link, the AP 102 may ensure a TXOP (Transmission Opportunity) in the other link. When the AP 102 ensures the TXOP, other STAs cannot transmit a frame. The AP 102 can ensure the TXOP by, for example, sending a CTS (Clear-To-Send)-to-self in the other link. Note that the CTS-to-self is a CTS transmitted to the sender itself. By receiving the CTS-to-self, STAs and other APs around the AP 102 cannot transmit a frame during the period designated by the CTS-to-self. According to this, if the AP 102 cannot concurrently perform transmission and reception, it is possible to prevent another apparatus from transmitting data to the AP 102 during transmission of an additional group addressed frame by the AP 102.

On the other hand, upon determining in step S405 that the AP 102 does not transmit an additional group addressed frame in all links (NO in step S405), the AP 102 executes processing for making the transmission end times match in all links (step S407). For example, in a link different from the link in which the additional group addressed frame is scheduled to be transmitted, the AP 102 can transmit a frame similar to the additional group addressed frame or transmit an empty group addressed frame. As described in association with step S406, the AP 102 may ensure the TXOP by transmitting a CTS-to-self in a link in which no additional group addressed frame is scheduled to be transmitted. Also, the AP 102 may transmit, for example, a unicast frame whose destination is set to the MAC address of the self-apparatus in another link or the transmission source MAC address. Also, the AP 102 may execute the process of step S407 by transmitting a management frame concerning associated with connection, a control frame including a trigger frame or an Ack frame, an action frame, or a data frame. At this time, when the value of a Duration field in the frame to be transmitted is designated, the TXOP can be ensured only during the designated period. However, this is merely an example, and the TXOP may be ensured using another field different from the Duration field, or a subfield. Note that the AP 102 may ensure the TXOP in advance using an RTS frame or a CTS-to-self frame, for example, not at the time of transmission of the additional group addressed frame but before transmission of the beacon.

Upon determining in step S404 that an additional group addressed frame does not exist (NO in step S404), when transmitting the beacon in the link in which the beacon transmission timing has deviated, the AP 102 transmits a frame in another link as well (step S408). Note that if the other link in which no beacon is transmitted is in a NAV (Network Allocation Vector) period, the AP 102 may not transmit a frame. Here, for example, a unicast frame, a group addressed frame, an RTS (Request-To-Send) frame, a FILS Discovery frame, or the like to be transmitted to the connected STA can be transmitted. Empty data without contents may be transmitted, or a unicast frame whose destination is set to the MAC address of the AP 102 itself in the link or the transmission source MAC address may be transmitted.

Upon determining that the timing of the beacon has not deviated in each link (NO in step S403), the AP 102 determines whether to transmit an additional group addressed frame (step S409). Upon determining not to transmit an additional group addressed frame (NO in step S409), the AP 102 transmits the beacon while making the transmission periods match in the links (step S413), and ends the processing. On the other hand, upon determining to transmit an additional group addressed frame (YES in step S409), the AP 102 determines whether to transmit the additional group addressed frame in all links (step S410). Upon determining to transmit the additional group addressed frame in all links (YES in step S410), the AP 102 transmits the additional group addressed frame while making the transmission periods match in the links (step S412). On the other hand, upon determining to transmit the additional group addressed frame only in some links (NO in step S410), the AP 102 ensures the TXOP in the links in which no additional group addressed frame is transmitted (step S411). This allows the AP 102 to prevent another apparatus from transmitting a signal addressed to the AP 102 in another link during the transmission of the additional group addressed frame in certain link.

Figure 5:
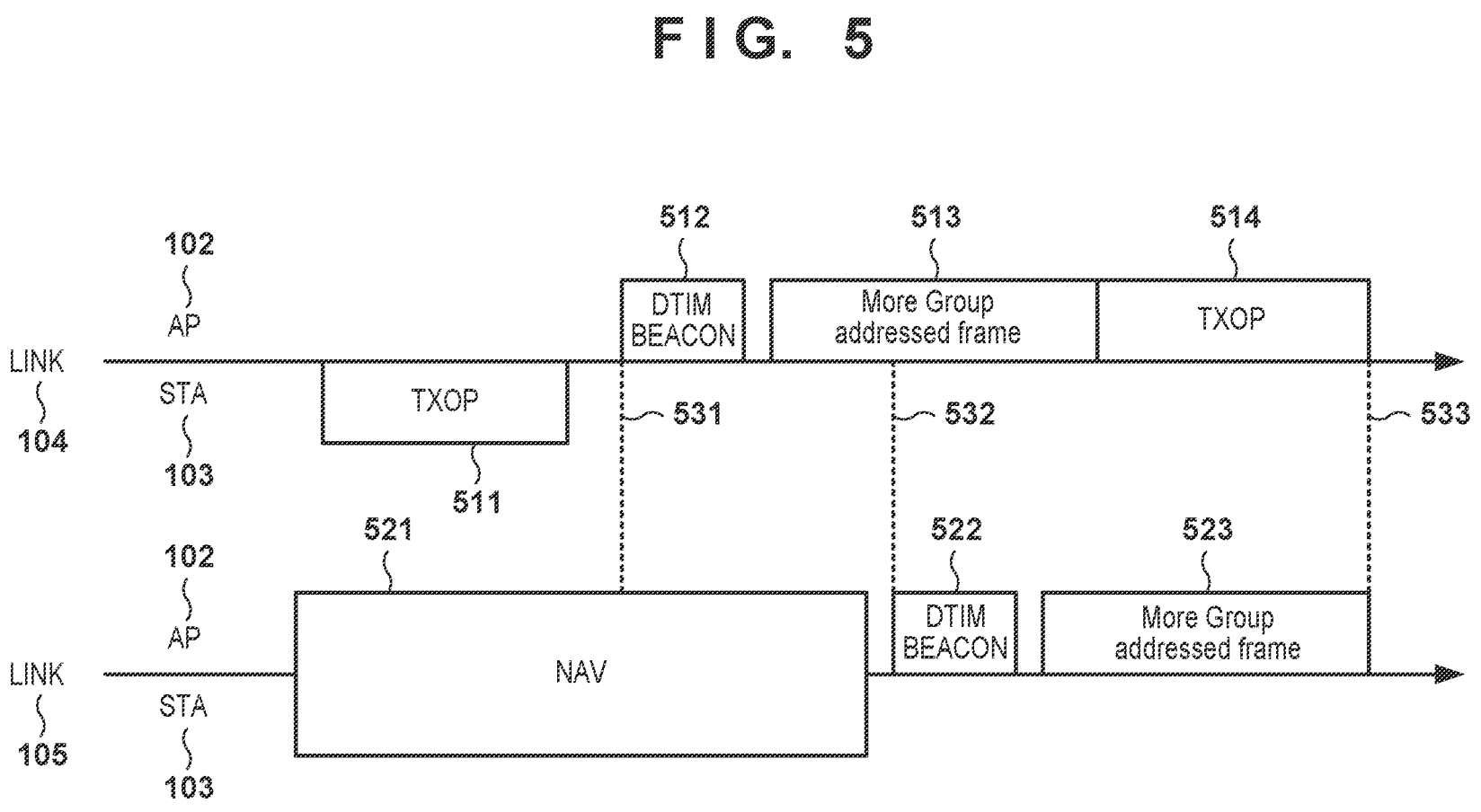

FIG. 5 shows an example of the procedure of communication when the AP 102 operates based on the processing shown in FIGS. 4A and 4B. Here, assume that the AP 102 transmits an additional group addressed frame next to a beacon in both the link 104 and the link 105. Here, in the link 105, the transmission timing of the beacon has deviated due to congestion of the channel.

In an example, a timing 531 after the AP 102 receives a frame from the STA 103 in a period 511 is the timing for transmitting the beacon. At this time, in the link 104, the AP 102 can transmit a beacon 512 as scheduled. On the other hand, the link 105 is in a NAV period 521 because, for example, the STA 106 is transmitting a data frame to another AP. At a timing 532 after the end of the NAV period, the AP 102 can transmit a beacon 522 even in the link 105. At this time, in the link 104, the AP 102 transmits the beacon 512 and, after that, transmits an additional group addressed frame 513. Frames are transmitted concurrently in the link 104 and the link 105. In the link 105, the AP 102 transmits the beacon 522 and, after that, transmits an additional group addressed frame 523.

Here, the transmission end timing of the additional group addressed frame 513 in the link 104 and that of the additional group addressed frame 523 in the link 105 are different from each other. For this reason, in time with a timing 533 at which the additional group addressed frame 523 in the link 105, whose transmission end timing is later, ends, the AP 102 ensures a TXOP 514 in the link 104 by, for example, one of the above-described methods. Since the AP 102 thus ensures the transmission right for all links, it is possible to prevent occurrence of a state in which the AP 102 needs to receive a frame in another link while transmitting a frame in a certain link.

Also, in this processing example, the AP 102 can transmit data to a specific STA during the time to ensure the TXOP. For this reason, the AP 102 can prevent transmission and reception from simultaneously occurring while efficiently using the frequency resource. In addition, even if some links cannot be used due to a reason irrelevant to wireless communication, for example, an interference wave from a microwave oven, the AP 102 can select a usable link and transmit a beacon.

Note that if the timing of the beacon has deviated, as in the link 105 shown in FIG. 5, the next beacon transmission opportunity after the transmission of the beacon of the deviated timing can be decided based on the original timing and period to transmit the beacon. For example, assume that the beacon transmission period is 100 TU, and a beacon is transmitted first at the timing of 0 TU and then transmitted at a deviated timing of 110 TU. In this case, the next beacon transmission timing can be decided to 200 TU based on the timing of 100 TU that tis the original transmission timing. Note that this is merely an example, and the beacon transmission timing may be decided based on another reference. For example, in the above-described example, it may be decided to transmit the next beacon at the timing of 210 TU based on the timing after deviation.

Processing Example 2

In this processing example as well, the AP 102 attempts to transmit beacons concurrently at the same timing (at a timing at which at least parts of transmission periods overlap) in both the link 104 and the link 105. Note that in this processing example as well, the AP 102 need not always transmit beacons simultaneously in the link 104 and the link 105 and is permitted to transmit beacons at different timings in the link 104 and the link 105.

FIG. 6 shows an example of the procedure of processing executed by the AP 102 in the second processing example. The processing shown in FIG. 6 is started when, for example, the AP 102 starts operating as an AP. Note that the processing shown in FIG. 6 can be implemented by, for example, the control unit 202 of the AP 102 executing a program stored in the storage unit 201 of the AP 102. However, the present invention is not limited to this, and, for example, some or all of the processes shown in FIG. 6 may be implemented by dedicated hardware. Also, the processing shown in FIG. 6 is merely an example. Unless there is a particular mention, the order of the processes may be changed, or some of the processes may be omitted or replaced with similar processes.

In this processing, the AP 102 first stands by until the timing for transmitting a beacon (step S601). If the time reaches the timing for transmitting the beacon (YES in step S601), the AP 102 confirms that each link is not busy (steps S602 and S603). Note that if data is being transmitted in a frequency channel for which another wireless communication apparatus is used in the link, or a NAV state is set by ensuring the TXOP, the AP 102 determines that the link is busy. Upon determining that all links are not busy (NO in step S602 and NO in step S603), the AP 102 transmits a beacon in all the links (step S604). In an example, the AP 102 may, for example, measure the time elapsed from the timing for transmitting a beacon. If one of the links remains busy until the elapsed time reaches a predetermined timeout time, the AP 102 may end the processing without transmitting a beacon.

After the beacon transmission, the AP 102 determines whether to transmit an additional group addressed frame (step S605). If an additional group addressed frame is not to be transmitted (NO in step S605), the AP 102 transmits the beacon while making the beacon transmission periods match (step S609), and ends the processing. On the other hand, if an additional group addressed frame is to be transmitted (YES in step S605), the AP 102 determines whether to transmit the additional group addressed frame in all links (step S606). If the additional group addressed frame is to be transmitted in all links (YES in step S606), the AP 102 transmits the additional group addressed frame while making the transmission periods match in all links (step S608). Note that to make the transmission periods match, addition of a padding bit or transmission of another frame may be performed, as described above. Also, when transmitting a beacon in each link, the AP 102 may ensure the TXOP common to other links in consideration of the transmission period of the additional group addressed frame. On the other hand, if the additional group addressed frame next to the beacon is to be transmitted only in a certain link (NO in step S606), the AP 102 ensures the TXOP in the link in which no additional group addressed frame is transmitted (step S607). This TXOP can be ensured throughout the period until the transmission of the group addressed frame is completed in other links. Note that the AP 102 can ensure the TXOP as in Processing Example 1 described above.

Figure 7:
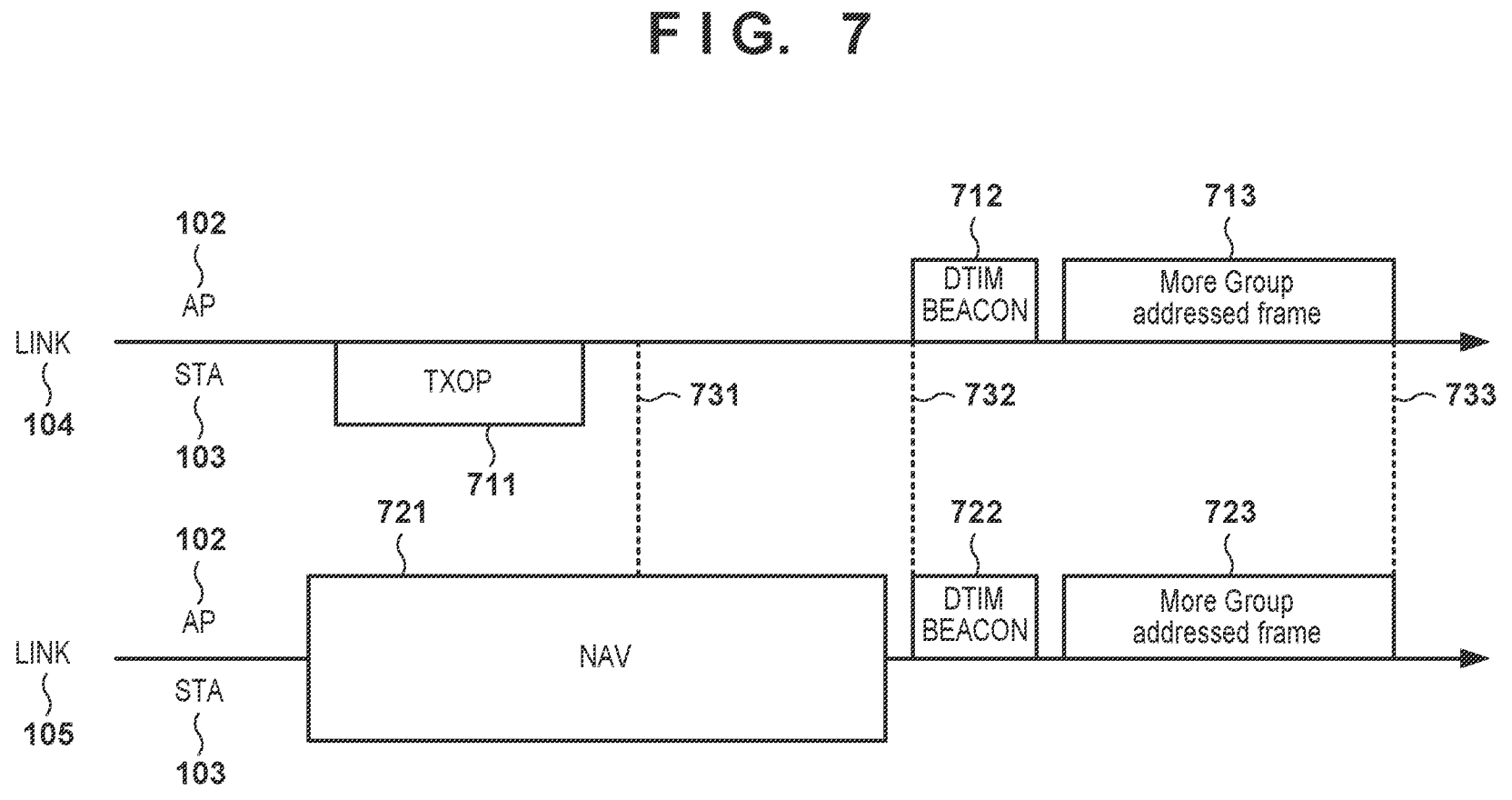

FIG. 7 shows an example of the procedure of communication when the AP 102 operates based on the processing shown in FIG. 6. Note that an example in which the additional group addressed frame is transmitted after the beacon transmission in all links will be described here. In the example shown in FIG. 7, at a transmission timing 731 of a beacon, the link 104 is not busy because a TXOP 711 by the STA 103 is ended. On the other hand, the link 105 is busy because a NAV period 721 is set due to, for example, the use of the frequency channel for communication by another STA 106. For this reason, since it is impossible to simultaneously transmit a beacon in the link 104 and the link 105, the AP 102 stands by without transmitting a beacon in both links. After that, at a timing 732 at which the link 105 is no longer busy, and both the link 104 and the link 105 are not busy, the AP 102 transmits a beacon 712 and a beacon 722 in both the link 104 and the link 105. After that, the AP 102 transmits an additional group addressed frame 713 in the link 104 and transmits an additional group addressed frame 723 in the link 105 as well. At this time, the AP 102 executes control for making the transmission periods of these frames match, thereby making transmission end timings 733 of the group addressed frames match in the link 104 and the link 105. Note that these additional group addressed frames may be absent, but even if only beacons are transmitted, control is performed to make the transmission end timings of the beacons match.

Thus, since frames are transmitted in all links, the AP 102 can prevent the occurrence of a state in which while a frame is transmitted in a link, a frame is received in another link. According to this processing example, it is possible to cope with a case where a beacon transmission timing arrives during reception of data from another STA in the link 105. That is, the AP 102 can prevent frame reception in the link 105 and beacon transmission in the link 104 from simultaneously occurring by performing the same processing as the above-described processing.

Note that the above-described processing example is merely an example, and processing different from the above-described processing may be performed. For example, in the above-described processing example, the beacon transmission timing in the link 104 is changed based on the NAV period in the link 105. However, the present invention is not limited to this. The AP 102 may set, for example, the link 104 to a primary link and the link 105 to a sub-link and execute control of deviating the beacon transmission timing as described above only when the beacon transmission timing has deviated in the primary link. That is, if the beacon transmission timing arrives during the NAV period of the link 104, the AP 102 cause the timing for transmitting the beacon to deviate in both the link 104 and the link 105. On the other hand, if the beacon transmission timing arrives during the NAV period of the link 105, the AP 102 cause only the beacon transmission timing in the link 105 to deviate but does not cause the beacon transmission timing in the link 104 to deviate. That is, the AP 102 may operate with priority on the primary link.

Also, in addition to the above-described processing, for example, the AP 102 may essentially be connected to the primary link, and concerning the sub-link, permit connection only for a communication apparatus capable of performing multi-link communication. According to this, the AP 102 can operate as an AP in multi-link communication while considering the operation of a communication apparatus that is operating in the link 104 but does not support multi-link communication. Note that in this case, for example, if a beacon cannot be transmitted at the beacon transmission timing in the link 105 because, for example, the link is in the NAV period at the beacon transmission timing, the AP 102 need not transmit a beacon in the link 105. This is because each STA connected to the AP 102 can maintain synchronization with the AP 102 even if a beacon is received only in the link 104. However, there exist operations that need to be executed for each link, such as a recovery operation from a power saving mode and an operation of correcting time variations. For this reason, the AP 102 transmits a beacon at a transmission enable timing in each link.

Processing Example 3

In this processing example, the AP 102 attempts to transmit beacons at different timings (at timings at which the transmission periods do not overlap each other) in the link 104 and the link 105. Note that the AP 102 need not always transmit beacons such that the transmission periods do not overlap in the link 104 and the link 105, and at least parts of the beacon transmission periods in the link 104 and the link 105 are permitted to overlap.

FIGS. 8A and 8B show an example of the procedure of processing executed by the AP 102 in the third processing example. The processing shown in FIGS. 8A and 8B is started when, for example, the AP 102 starts operating as an AP. Note that the processing shown in FIGS. 8A and 8B can be implemented by, for example, the control unit 202 of the AP 102 executing a program stored in the storage unit 201 of the AP 102. However, the present invention is not limited to this, and, for example, some or all of the processes shown in FIGS. 8A and 8B may be implemented by dedicated hardware. Also, the processing shown in FIGS. 8A and 8B is merely an example. Unless there is a particular mention, the order of the processes may be changed, or some of the processes may be omitted or replaced with similar processes.

In this processing example, the AP 102 first stands by until the beacon transmission time (step S801). Then, when transmitting a beacon, the AP 102 confirms the state of another link other than the link in which the beacon is transmitted. Note that the order of procedures of confirming another link in the following description is merely an example, and the order of these procedures may be changed. For example, the AP 102 first determines whether a frame is being transmitted in another link as well (step S802). If a frame is being transmitted in another link as well (YES in step S802), the AP 102 transmits a beacon or an additional group addressed frame in time with the transmission time of the other link (step S810). Note that in the other link, various kinds of frames may be transmitted and, for example, a management frame including a beacon frame, a data frame of a unicast frame, and a control frame including a trigger frame can be transmitted. Also, in the another link, a group addressed frame whose destination is set to a multicast address or a broadcast address or an action frame may be transmitted.

Upon determining, as the confirmation of the state of the other link, that a frame is not being transmitted in the other link (NO in step S802), the AP 102 then determines whether the other link is in the NAV period (step S803). Upon determining that the other link is not in the NAV period (NO in step S803), the AP 102 ensures the TXOP until the beacon transmission period (and a frame transmission period if an additional group addressed frame accompanying a beacon exists) ends (step S809). The AP 102 thus ensures the transmission right even in the other link, thereby preventing signal reception in the other link during the beacon transmission period (and the transmission period of the additional group addressed frame). The method of ensuring the TXOP is as described above. A repetitive description will be omitted here, and this also applies below.

Upon determining, as the confirmation of the state of the other link, that the other link is in the NAV period (YES in step S803), the AP 102 then determines whether the self-apparatus is receiving a frame (step S804). If a frame is being received in the other link (YES in step S804), the AP 102 cannot transmit a frame during the reception. For this reason, in this case, the AP 102 stands by until the timing at which a frame can be transmitted and then transmits a beacon (step S808). Note that the AP 102 ensures the TXOP of the other link during the beacon transmission period. Note that in this case, since the AP 102 receives the frame in the other link until immediately before, it may need to transmit an acknowledgement (an Ack frame or a Block Ack frame) to the frame. For this reason, the AP 102 can ensure the TXOP to transmit the acknowledgement. Note that the Ack frame or the Block Ack frame is a kind of control frame.

In a state in which no frame is being received during the NAV period of the other link (NO in step S804), for example, the STA 106 is assumed to be transmitting or receiving a data frame to/from another AP. In this state, the AP 102 is assumed not to receive data during the NAV period. In this case, if the beacon transmission is completed during the NAV period, data to the self-apparatus never arrives in the other link, and the AP 102 can perform only the beacon transmission. Hence, the AP 102 determines whether the NAV period of the other link expires during the beacon transmission period (and a frame transmission period if an additional group addressed frame accompanying a beacon exists) (step S805). If the NAV period of the other link does not expire during the transmission period of the beacon or the like (NO in step S805), the AP 102 directly transmits the beacon or the like (step S807). On the other hand, if the NAV period of the other link expires during the transmission period of the beacon or the like (YES in step S805), the AP 102 ensures the TXOP such that transmission of a signal addressed to the AP 102 does not occur in the transmission period in the other link (step S806). Note that in the other link, the AP 102 starts transmitting the beacon at the beacon transmission time. Also, the AP 102 may transmit an arbitrary frame during the period of the TXOP ensured in step S806.

In the above-described way, when individually transmitting a beacon in each link, the AP 102 can prevent a frame to the self-apparatus from arriving in the other link during transmission of a beacon or the like in one link.

Figure 9:
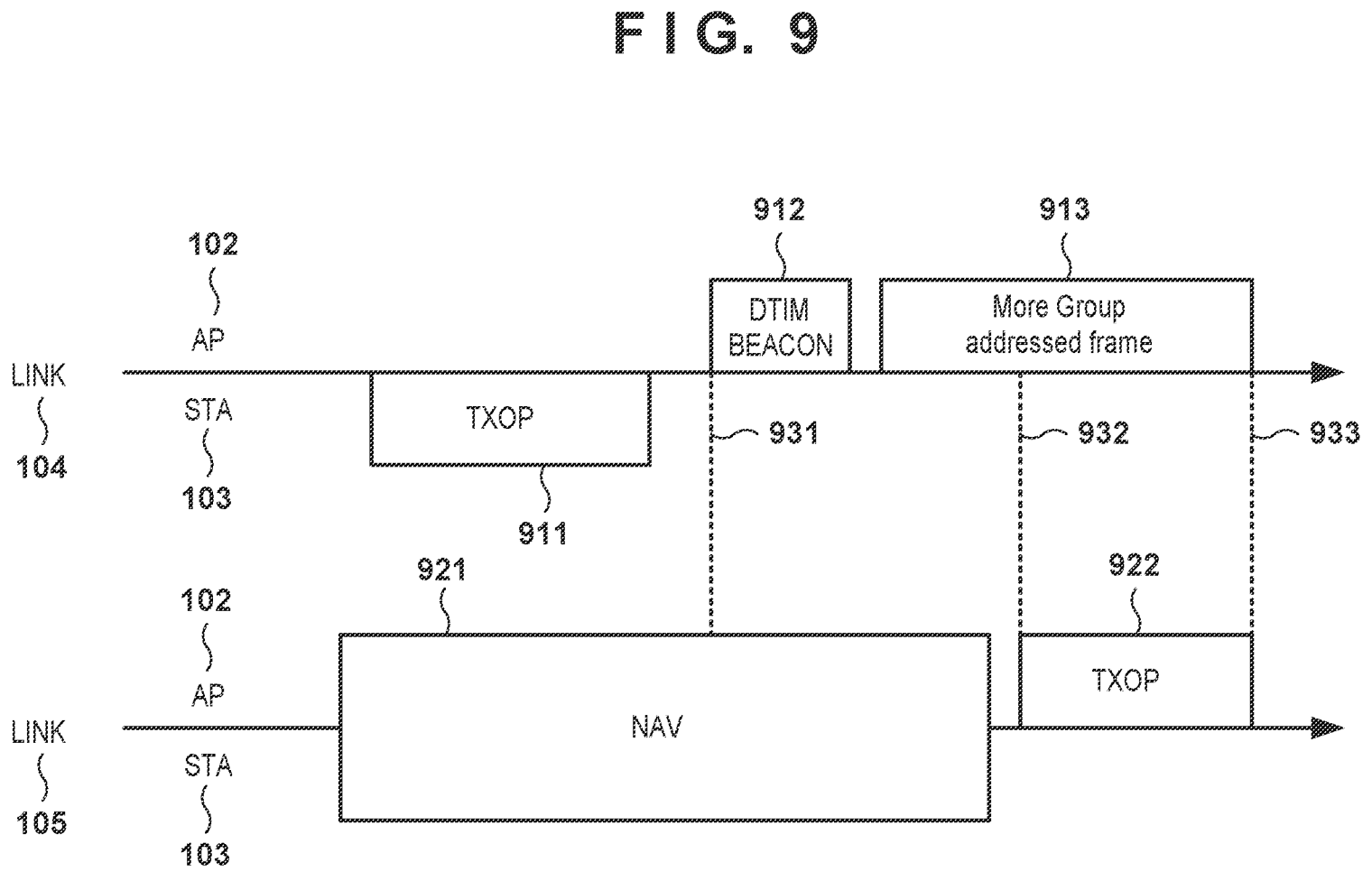

FIG. 9 shows an example of the procedure of communication when the AP 102 operates based on the processing shown in FIGS. 8A and 8B. FIG. 9 shows an example of the procedure of communication when the NAV period expires during transmission of a beacon and an additional group addressed frame accompanying that. In the example shown in FIG. 9, at a transmission timing 931 of a beacon, a TXOP 911 by the STA 103 is ended in the link 104. On the other hand, a NAV period 921 is set in the link 105 because, for example, the frequency channel is used for communication by another STA 106. On the other hand, if beacon transmission is started at the transmission timing 931 in the link 104, the transmission of a series of frames is completed at a timing 933. At this time, since the NAV period 921 expires before the timing 933, in the link 105, the AP 102 ensures a TXOP 922 during the period from a timing 932 to the timing 933 in which the transmission right can be ensured. Note that the AP 102 may transmit a frame in the TXOP 922. In this way, the AP 102 can prevent a frame to the self-apparatus from arriving in the link 105 during the transmission period of a beacon 912 and an additional group addressed frame 913 in the link 104.

Figure 10:
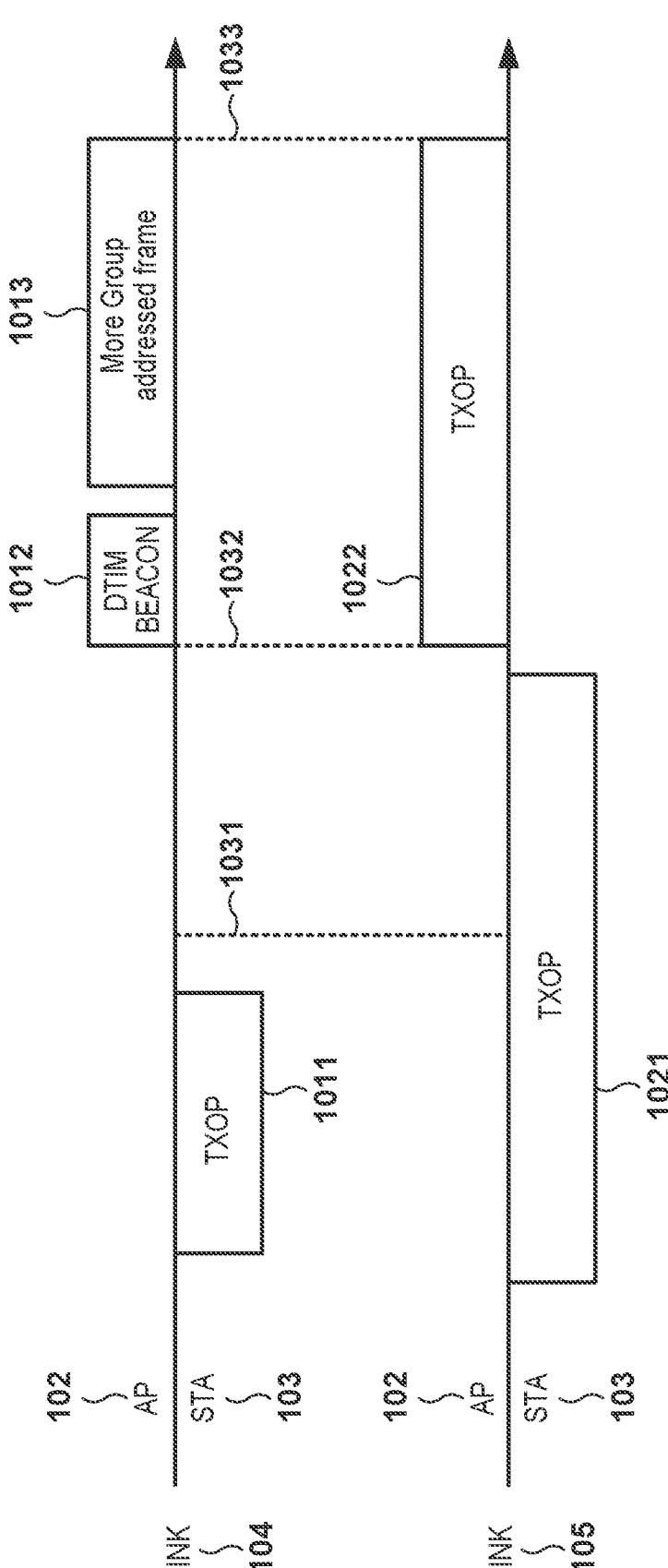
FIG. 10 is a view showing an example of the procedure of communication in the wireless communication system.

FIG. 10 shows another example of the procedure of communication when the AP 102 operates based on the processing shown in FIGS. 8A and 8B. FIG. 10 shows an example in a case where the AP 102 is receiving a data frame from the STA 103 in the link 105 during the beacon transmission time in the link 104. That is, in the example shown in FIG. 10, at a transmission timing 1031 of a beacon, in the link 104, a TXOP 1011 by the STA 103 is ended. However, in the link 105, a TXOP 1021 by the STA 103 is continued, and the AP 102 is receiving a frame. For this reason, the AP 102 stands by without transmitting a beacon until the TXOP 1021 by the STA 103 in the link 105 is ended. Note that FIG. 10 shows a case where the STA 103 is a STA that operates in a multi-link. However, the STA 103 may be a communication apparatus that does not support multi-link communication. Then, at a timing 1032 at which the reception of the frame from the STA 103 is ended, and the transmission right can be ensured in the link 105, the AP 102 starts transmitting a beacon 1012 and an additional group addressed frame 1013 in the link 104. At this time, the AP 102 ensures a TXOP 1022 in the link 105 such that a frame to the self-apparatus does not arrive. As the TXOP 1022, a period until the transmission of the beacon 1012 and the additional group addressed frame 1013 (and another frame if the frame is transmitted) is completed in the link 104 is set. That is, in the example shown in FIG. 10, the TXOP 1022 is ensured in the link 105 until a timing 1033 of completion of the transmission of the additional group addressed frame 1013 in the link 104. Note that in the example shown in FIG. 10, since the TXOP 1022 is a period immediately after the frame is received during the period of the TXOP 1021 of the STA 103, the AP 102 can transmit an acknowledgement to the frame in the TXOP 1022. In this way, the AP 102 can prevent a frame to the self-apparatus from arriving in the link 105 during the transmission period of the beacon 1012 and the additional group addressed frame 1013 in the link 104.

In this processing example, even in an environment in which interference that does not derive from communication, like a microwave oven, exists in a link, the AP 102 can perform communication (beacon transmission or the like) in another link. Also, if data is being received in the link on the side where no beacon is transmitted, the AP 102 suspends transmission, thereby preventing transmission and reception from simultaneously occurring. Note that if the timing of transmitting a beacon is different on a link basis, as in this processing example, the degree of freedom of communication in each link can be improved. On the other hand, when the beacon transmission timings are made to match, as in Processing Example 1 or Processing Example 2 described above, processing of, for example, ensuring the TXOP in the other link during beacon transmission in a link is unnecessary, and therefore, overhead for this can be reduced. Note that the above-described processing examples can be used in combination. For example, if a NAV period or interference that does not derive from communication, like a microwave oven, exists, Processing Example 1 or Processing Example 3 is used. On the other hand, if data is being received in the link on the side where no beacon is transmitted, Processing Example 2 can be used. Thus, it is possible to prevent a concurrent occurrence of transmission and reception in the AP 102 while effectively using advantages of each processing example described above.

In the above-described embodiment, the description has been made assuming that the AP 102 and the STA 103 perform channel access by EDCA (Enhanced Distributed Channel Access). However, the present invention is not limited to this and, for example, as for UL (uplink) communication from the connected STA, the AP 102 may permit only communication based on a trigger frame. In this case, the AP 102 performs channel assignment such that at a timing of transmitting a beacon in a link, UL communication is not performed in another link. This can prevent a frame to the self-apparatus from arriving from the STA during the beacon transmission period.

Note that in the above-described embodiment, a method of the AP 102 preventing data to the self-apparatus from occurring by, for example, acquiring the transmission right in a link in which no beacon is transmitted has been described. In place of or in addition to this, the AP 102 may operate to lower the probability that data to the self-apparatus occurs. For example, the AP 102 can receive, from the STA connected to the self-apparatus, an RTS frame for requesting data transmission. In this case, the AP 102 specifies, from a value indicated in the Duration field of the RTS, the period of the TXOP to be ensured by the STA that is the transmission source of the RTS, and determines whether the period overlaps the beacon transmission period in another link. If the period of the TXOP to be ensured by the STA and the beacon transmission period in another link at least partially overlap, the AP 102 can reject the RTS by not transmitting a CTS that is a response to the received RTS. Accordingly, the STA cannot ensure the TXOP, and the probability that a frame addressed to the AP 102 is transmitted in the beacon transmission period of the AP 102 can be reduced.

According to the present invention, it is possible to inhibit a communication apparatus from concurrently performing transmission and reception.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus that performs communication complying with IEEE802.11 standard series with a partner apparatus using a plurality of radio links, the communication apparatus comprising:

at least one memory that stores a set of instructions; and at least one processor that executes the instructions, the instructions, when executed, causing the communication apparatus to perform operations comprising:

controlling, in a case where a predetermined frame that is a group addressed frame is to be transmitted in a first radio link of the plurality of radio links, the communication apparatus to execute control processing that includes transmission of a frame in the second radio link to ensure a transmission opportunity during a period in which the predetermined frame is transmitted in the first radio link, wherein a value of a Duration field in the frame transmitted in the second radio link is set to a period corresponding to the period in which the predetermined frame is transmitted in the first radio link.

2. The communication apparatus according to claim 1, wherein the frame transmitted in the second radio link to ensure the transmission opportunity is an empty frame.

3. The communication apparatus according to claim 1, wherein the frame transmitted in the second radio link to ensure the transmission opportunity is a group addressed frame.

4. The communication apparatus according to claim 1, wherein the frame transmitted in the second radio link to ensure the transmission opportunity includes a padding bit based on a length of the period in which the predetermined frame is transmitted in the first radio link.

5. The communication apparatus according to claim 1, wherein the frame transmitted in the second radio link to ensure the transmission opportunity is one of CTS (Clear-To-Send) frame and an RTS (Request-To-Send) frame, wherein the frame is transmitted in the second radio link to ensure the transmission right opportunity before a start of the period.

6. The communication apparatus according to claim 1, wherein the control processing is performed based on occurrence of deviation of a timing of transmitting the predetermined frame in the first radio link from a transmission timing determined in advance.

7. The communication apparatus according to claim 6, wherein the occurrence of the deviation of the timing of transmitting the predetermined frame in the first radio link from a transmission timing determined in advance includes occurrence of first deviation caused by a frame addressed to the communication apparatus is received in the second radio link, in spite of arrival of the timing of transmitting the predetermined frame, wherein, upon the occurrence of the first deviation, the control processing and the transmission of the predetermined frame on the first link are executed after the reception of the frame addressed to the communication apparatus is completed.

8. The communication apparatus according to claim 6, wherein the operation further comprises, in a case where at the transmission timing of the predetermined frame determined in advance, the transmission opportunity cannot be obtained in the second radio link, and the frame addressed to the communication apparatus is not received, transmitting the predetermined frame in the first radio link at the transmission timing determined in advance.

9. The communication apparatus according to claim 8, wherein the operation further comprises, in a case where obtaining of the transmission opportunity is enabled in the second radio link during a period in which the predetermined frame is currently transmitted in the first radio link, transmitting a frame in the second radio link to ensure a transmission opportunity during a period after obtaining of the transmission opportunity is enabled until the transmission of the predetermined frame is completed.

10. The communication apparatus according to claim 1, wherein the predetermined frame includes a beacon.

11. The communication apparatus according to claim 1, wherein the communication apparatus is an access point.

12. A control method executed by a communication apparatus that performs communication complying with the IEEE802.11 standard series with a partner apparatus using a plurality of radio links, comprising:

controlling, in a case where a predetermined frame that is a group addressed frame is to be transmitted in a first radio link of the plurality of radio links, the communication apparatus to execute a control processing for preventing a frame addressed to the communication apparatus does not arrive in a second radio link different from the first radio link of the plurality of radio links, wherein the control processing includes transmits a frame in the second radio link to ensure a transmission opportunity during a period in which the predetermined frame is transmitted in the first radio link, and wherein a value of a Duration field in the frame transmitted in the second radio link is set to a period corresponding to the period in which the predetermined frame is transmitted in the first radio link.

13. A non-transitory computer-readable storage medium that stores a program configured to cause a computer included in a communication apparatus to perform operations comprising:

controlling, in a case where a predetermined frame that is a group addressed frame is to be transmitted in a first radio link of the plurality of radio links, the communication apparatus to execute a control processing for preventing a frame addressed to the communication apparatus does not arrive in a second radio link different from the first radio link of the plurality of radio links, wherein the control processing includes transmits a frame in the second radio link to ensure a transmission opportunity during a period in which the predetermined frame is transmitted in the first radio link, and wherein a value of a Duration field in the frame transmitted in the second radio link is set to a period corresponding to the period in which the predetermined frame is transmitted in the first radio link.

* * * * *